(12) United States Patent
Tomari et al.

(10) Patent No.: US 7,143,110 B2
(45) Date of Patent: Nov. 28, 2006

(54) INFORMATION TERMINAL, SERVER, INFORMATION DISPLAY SYSTEM AND INFORMATION DISPLAY METHOD

(75) Inventors: Yoichiro Tomari, Tokyo (JP); Masashi Saito, Tokyo (JP); Reiko Okada, Tokyo (JP); Hiroshi Yamanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 450 days.

(21) Appl. No.: 09/881,728

(22) Filed: Jun. 18, 2001

(65) Prior Publication Data

US 2001/0042103 A1 Nov. 15, 2001

Related U.S. Application Data

(63) Continuation of application No. PCT/JP00/04315, filed on Jun. 29, 2000.

(30) Foreign Application Priority Data

Nov. 10, 1999 (JP) .................................. 11-319442

(51) Int. Cl.
*G06F 17/00* (2006.01)

(52) U.S. Cl. .................. 707/104.1; 707/10; 709/206

(58) Field of Classification Search .................. 707/1, 707/3, 102, 10, 104.1, 200, 204; 709/223, 709/224, 206, 207, 201, 218
See application file for complete search history.

(56) References Cited

U.S. PATENT DOCUMENTS

| | | | | |
|---|---|---|---|---|
| 5,436,965 A | * | 7/1995 | Grossman et al. | 379/266.08 |
| 5,590,178 A | * | 12/1996 | Murakami et al. | 379/93.18 |
| 5,875,302 A | | 2/1999 | Obhan | 709/225 |
| 6,052,735 A | * | 4/2000 | Ulrich et al. | 709/236 |
| 6,134,582 A | * | 10/2000 | Kennedy | 709/206 |
| 6,212,553 B1 | * | 4/2001 | Lee et al. | 709/206 |
| 6,230,189 B1 | * | 5/2001 | Sato et al. | 709/206 |
| 6,418,469 B1 | * | 7/2002 | Justice et al. | 709/224 |
| 6,424,995 B1 | * | 7/2002 | Shuman | 709/206 |
| 6,560,222 B1 | * | 5/2003 | Pounds et al. | 370/353 |
| 6,889,246 B1 | * | 5/2005 | Kawamoto et al. | 709/204 |

FOREIGN PATENT DOCUMENTS

| | | |
|---|---|---|
| EP | 0745937 A2 | 4/1996 |
| JP | 5-266028 | 10/1993 |
| JP | 6-284145 | 10/1994 |
| JP | 10-187561 | 7/1998 |
| JP | 11-017734 | 1/1999 |
| JP | 11-112556 | 4/1999 |
| JP | 11-161572 | 6/1999 |
| JP | 11-308268 | 11/1999 |

OTHER PUBLICATIONS

John R. Nicholson ("Sams Teach Yourself Outlook 98 in 24 Hours" Published in 1998, pp. 141 and 143).*
Bob Temple ("the Complete Idiot's Guide to Microsoft Outlook 2000", Published 1999, p. 79).*

* cited by examiner

*Primary Examiner*—Greta Robinson
(74) *Attorney, Agent, or Firm*—Birch, Stewart, Kolasch, Birch, LLP (57) ABSTRACT

An information terminal includes a history management section for recording history information about communication; an information management table for recording history related information indicating a processing state of the history information; and an information history list display section for displaying the history information in connection with the processing state of the history information in accordance with the history related information.

19 Claims, 9 Drawing Sheets

220

INFORMATION HISTORY LIST

| UNREAD | TYPE | TIME AND DATE | PARTY | REPLY | |
|---|---|---|---|---|---|
| | INCOMING TEL 1 | 6/5 10:27 | TOMARI | 6/5 TEL FINISHED | 221 |
| | INCOMING MAIL 1 | 6/6 20:02 | NAKA | UNPROCESSED | 222 |
| | ANSWERING 1 | 6/7 13:55 | YAMANAKA | 6/8 MAIL FINISHED | 223 |
| | OUTGOING MAIL 1 | 6/8 21:45 | TAMURA | 6/9 MAIL REPLY | 224 |
| | W1 WEATHER | 6/10 23:32 | HAYASHI | 6/10 MAIL TRANSFER | 225 |
| | INCOMING TEL 2 | 6/16 20:02 | NAKA | PROCESSING UNNECESSARY | 226 |
| UNREAD | INCOMING MAIL 2 | 6/20 14:43 | SAITOU | | 227 |

FIG.4

INFORMATION HISTORY LIST — 220

| UNREAD | TYPE | TIME AND DATE | PARTY | REPLY | |
|---|---|---|---|---|---|
|  | INCOMING TEL 1 | 6/5 10:27 | TOMARI | 6/5 TEL FINISHED | 221 |
|  | INCOMING MAIL 1 | 6/6 20:02 | NAKA | UNPROCESSED | 222 |
|  | ANSWERING 1 | 6/7 13:55 | YAMANAKA | 6/8 MAIL FINISHED | 223 |
|  | OUTGOING MAIL 1 | 6/8 21:45 | TAMURA | 6/9 MAIL REPLY | 224 |
|  | W1 WEATHER | 6/10 23:32 | HAYASHI | 6/10 MAIL TRANSFER | 225 |
|  | INCOMING TEL 2 | 6/16 20:02 | NAKA | PROCESSING UNNECESSARY | 226 |
| UNREAD | INCOMING MAIL 2 | 6/20 14:43 | SAITOU |  | 227 |

FIG.5

HISTORY OPERATION MENU

228
- REPLY BY MAIL
- REPLY BY TELEPHONE
- TRANSFER BY MAIL
- ESTABLISH ASSOCIATION
- MAKE PROCESSED
- MAKE UNPROCESSED
- PROCESSING UNNECESSARY
- DELETE HISTORY

FIG.6

INFORMATION MANAGEMENT TABLE

| | | |
|---|---|---|
| INCOMING TEL 1 | OUTGOING TEL 1 | — 191 |
| INCOMING MAIL 1 | UNPROCESSED | — 192 |
| ANSWERING 1 | OUTGOING MAIL 2 | — 193 |
| OUTGOING MAIL 1 | INCOMING MAIL 2 | — 194 |
| W1 | OUTGOING MAIL 3 | — 195 |
| INCOMING TEL 2 | PROCESSING UNNECESSARY | — 196 |
| INCOMING MAIL 2 | UNREAD | — 197 |

Table labeled 19.

FIG.7

PERSONAL ADDRESS BOOK (20)

| NAME | MAIL ADDRESS | PHONE NUMBER |
|---|---|---|
| TOMARI | tomari@melco.co.jp | 09001234567 |
| NAKA | naka@melco.co.jp | 09002345678 |
| YAMANAKA | yamanaka@melco.co.jp | 09003456789 |
| TAMURA | tamura@melco.co.jp | 09004567890 |

FIG.8

INCOMING HISTORY MANAGEMENT SECTION (13)

| TYPE | PARTY | TIME AND DATE |
|---|---|---|
| ⋮ | ⋮ | ⋮ |
| INCOMING TEL 1 | 09001234567 | 6/5 10:27 |
| ⋮ | ⋮ | ⋮ |

FIG.9

INFORMATION
MANAGEMENT TABLE

| | | |
|---|---|---|
| : | : | ~19 |
| INCOMING TEL 1 | UNPROCESSED | |
| : | : | |

FIG.10

INFORMATION HISTORY LIST — 220

| UNREAD | TYPE | TIME AND DATE | PARTY | REPLY |
|---|---|---|---|---|
| | : | : | | |
| | INCOMING TEL 1 | 6/5 10:27 | TOMARI | UNPROCESSED |
| | : | | | |

FIG.11

OUTGOING HISTORY
MANAGEMENT SECTION — 14

| TYPE | PARTY | TIME AND DATE |
|---|---|---|
| : | | |
| OUTGOING TEL 1 | 09001234567 | 6/5 12:51 |
| : | | |

FIG.12

INFORMATION
MANAGEMENT TABLE

```
        :                :             ~19
        :                :
   INCOMING TEL 1   OUTGOING TEL 1
        :                :
        :                :
```

INFORMATION HISTORY LIST

| UNREAD | TYPE | TIME AND DATE | PARTY | REPLY |
|---|---|---|---|---|
|  | INCOMING TEL 1 | 6/5 10:27 | TOMARI | 6/5 TEL FINISHED |

INFORMATION TERMINAL, SERVER, INFORMATION DISPLAY SYSTEM AND INFORMATION DISPLAY METHOD

CROSS-REFERENCE TO THE RELATED APPLICATION

This application is a Continuation of PCT International Application No. PCT/JP00/04315 filed on Jun. 29, 2000, which was published in English and which designated the United States, and on which priority is claimed under 35 U.S.C. § 120, the entire contents of which are hereby incorporated by reference.

BACKGROUND OF THE INVENTION

1. Field of the Invention

The present invention relates to an information terminal, a server, an information display system and an information display method for displaying history information about communications such as telephone calls and electronic mail.

2. Description of Related Art

Conventional information terminals such as mobile telephones can display history information about received or transmitted messages, incoming or outgoing calls, or about telephone-answering services on their screen. Thus, a user can perform various operations after confirming the history information.

Figure 1:
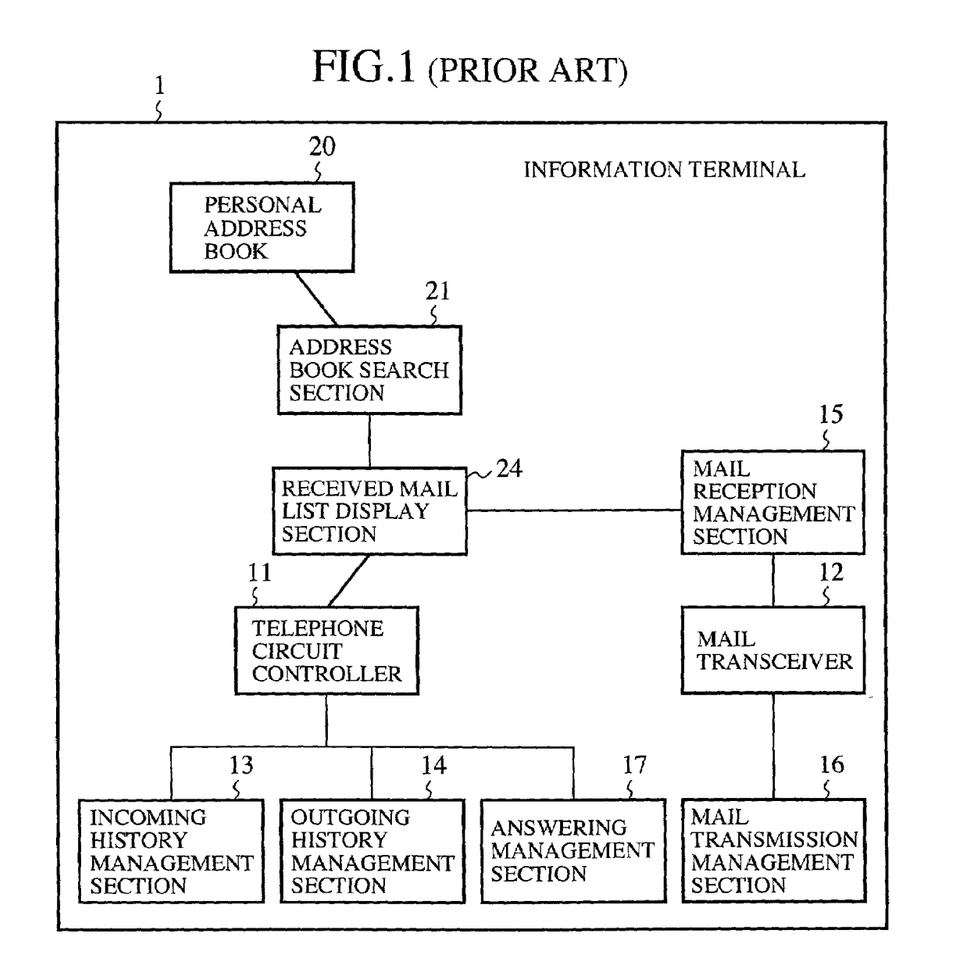
FIG. 1 is a block diagram showing a configuration of a conventional information terminal.

FIG. 1 is a block diagram showing a configuration of a conventional information terminal inferred from an electronic mail apparatus disclosed in Japanese patent application laid-open No. 11-17734/1999. In FIG. 1, the reference numeral 11 designates a telephone circuit controller for controlling incoming and outgoing calls via telephone lines, and 12 designates a mail transceiver for transmitting and receiving electronic mail messages.

The reference number 13 designates an incoming history management section for recording an incoming history of the telephone such as telephone numbers and time and date of incoming calls; 14 designates an outgoing history management section for recording an outgoing history such as parties' telephone numbers and time and date of outgoing calls of the telephone; 15 designates a mail reception management section for recording a receiving history of mail messages such as parties' mail addresses and time and date of the mail; 16 designates a mail transmission management section for recording a transmission history of mail such as parties' mail addresses and time and date of the mail transmission; and 17 designates an answering management section for recording an answering history of parties' telephone numbers and time and date of incoming calls recorded in a telephone answering machine.

The reference numeral 20 designates a personal address book recording personal names and communication addresses of the parties; 21 designates an address book search section for searching the personal address book 20; and 24 designates a received mail list display section for displaying the list of received mail.

Next, the operation of the conventional information terminal will be described.

Figure 2:
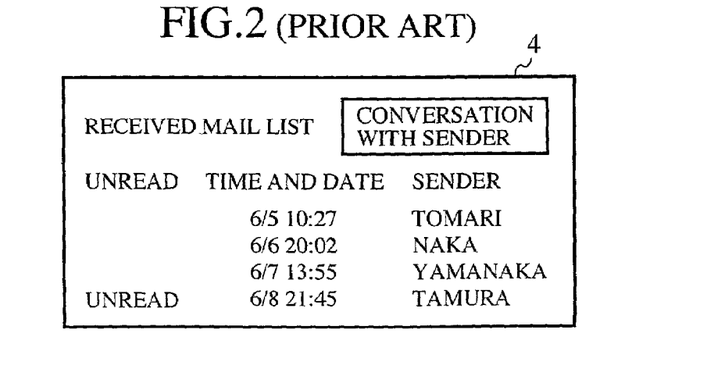
FIG. 2 is a diagram illustrating an example of a received mail list screen of the conventional information terminal.

FIG. 2 illustrates an example of a received mail list screen 4 controlled by the received mail list display section 24 of FIG. 1.

According to the conventional technique, a user selects one of the received mail displayed, and selects a message "conversation with sender" displayed on the received mail list screen 4 of FIG. 2. In response to the selection, the address book search section 21 retrieves the telephone number corresponding to the mail address from the personal address book 20, and the telephone circuit controller 11 automatically dials the telephone number. Thus, the user can reply the originating party of the received mail by telephone with a simple operation.

With the foregoing configuration, the conventional information terminal can reply the party by telephone through the operation on the received mail list screen 4. However, since the information about the reply to the received mail is not recorded, a problem arises as to whether the reply to the received mail has been completed or not.

In addition, since the receiving history, outgoing history and the like are displayed separately on the screen, when the user communicates utilizing a plurality of different communication means, another problem arises in that the user cannot watch all the histories unless all the screens are displayed corresponding to the communication means. Furthermore, it is difficult for the user to learn the relationships of the histories.

The present invention is implemented to solve the foregoing problems. Therefore, an object of the present invention is to provide an information terminal, a server, an information display system and an information display method capable of displaying the communication history information in such a manner that the user can see at a glance whether the processing of the received mail, transmitted mail, incoming calls (telephone) and outgoing calls (telephone) has already been completed or not, and see at a glance the relationships between the pieces of the history information, thereby enabling an efficient management of the history information.

SUMMARY OF THE INVENTION

According to a first aspect of the present invention, there is provided an information terminal comprising: an information history list display section for displaying history information of communication in connection with a processing state of the history information in accordance with history related information indicating the processing state of the history information.

Here, the information terminal may further comprise: a history management section for recording the history information about communication; and an information management table for recording the history related information that indicates the processing state of the history information stored in the history management section.

The information management table may record relationships between the history information stored in the history management section as the history related information; and the information history list display section may display the history information in connection with the history information about that history information in accordance with the history related information stored in the information management table.

The information history list display section may display the history information about communication by a plurality of different communication means together.

The information terminal may further comprise: a personal address book for recording a personal name of a communication party and a communication address of the communication party; and an address book search section for searching the personal address book, wherein the information history list display section may display the personal name in substitution for the communication address included in the history information stored in the history management section in accordance with a retrieval result from the personal address book by the address book search section.

The information history list display section may receive the history information and the history related information from a server, and display the received history information in connection with the processing state of the history information in accordance with the received history related information.

The information terminal may further comprise: a history management section for recording the history information about communication, wherein the information history list display section may receive the history related information indicating the processing state of the history information from a server, and display the history information in connection with the processing state of the history information in accordance with the received history related information.

The information terminal may further comprise: an information management table for recording the history related information that indicates the processing state of the history information about communication stored in a server, wherein the information history list display section may receive the history information about communication from the server, and display the received history information in connection with the processing state of the history information in accordance with the history related information stored in the information management table.

According to a second aspect of the present invention, there is provided a server comprising: a personal information management section for transmitting, in response to a request from an information terminal that displays history information about communication in connection with a processing state of the history information, requested information to the information terminal.

The server may further comprise: a history management section for recording the history information about communication; and an information management table for recording history related information that indicates a processing state of the history information stored in the history management section, wherein the personal information management section nay transmit the history information stored in the history management section and the history related information stored in the information management table to the information terminal in response to a request from the information terminal.

The server may further comprise: an information management table for recording history related information indicating a processing state of the history information about communication, wherein the personal information management section may transmit the history related information stored in the information management table to the information terminal in response to a request from the information terminal.

The server may further comprise: a history management section for recording history information about communication, wherein the personal information management section may transmit the history information stored in the history management section to the information terminal in response to a request from the information terminal.

According to a third aspect of the present invention, there is provided an information display system including an information terminal and a server capable of communicating with each other, the information display system comprising: a history management section for recording history information about communication; an information management table for recording history related information that indicates a processing state of the history information stored in the history management section; and an information history list display section for displaying the history information in connection with the processing state of the history information in accordance with the history related information stored in the information management table.

Here, the server may comprise the history management section and the information management table, along with a personal information management section for transmitting the history information stored in the history management section and the history related information stored in the information management table to the information terminal, and the information terminal may comprise the information history list display section, wherein the information history list display section may receive the history information and history related information transmitted from the personal information management section.

The server may comprise the information management table, along with a personal information management section for transmitting the history related information stored in the information management table to the information terminal, and the information terminal may comprise the history management section and the information history list display section, wherein the information history list display section may receive the history related information transmitted from the personal information management section.

The server may comprise the history management section, along with a personal information management section for transmitting the history information stored in the history management section to the information terminal, and the information terminal may comprise the information management table and the information history list display section, wherein the information history list display section may receive the history information transmitted from the personal information management section.

According to a fourth aspect of the present invention, there is provided an information display method comprising the steps of: recording history information about communication; recording history related information indicating a processing state of the history information; and displaying the history information in connection with the processing state of the history information in accordance with the history related information.

DETAILED DESCRIPTION OF THE PREFERRED EMBODIMENTS

The best mode for carrying out the present invention will now be described with reference to the accompanying drawings to explain the invention in more detail.

Embodiment 1

Figure 3:
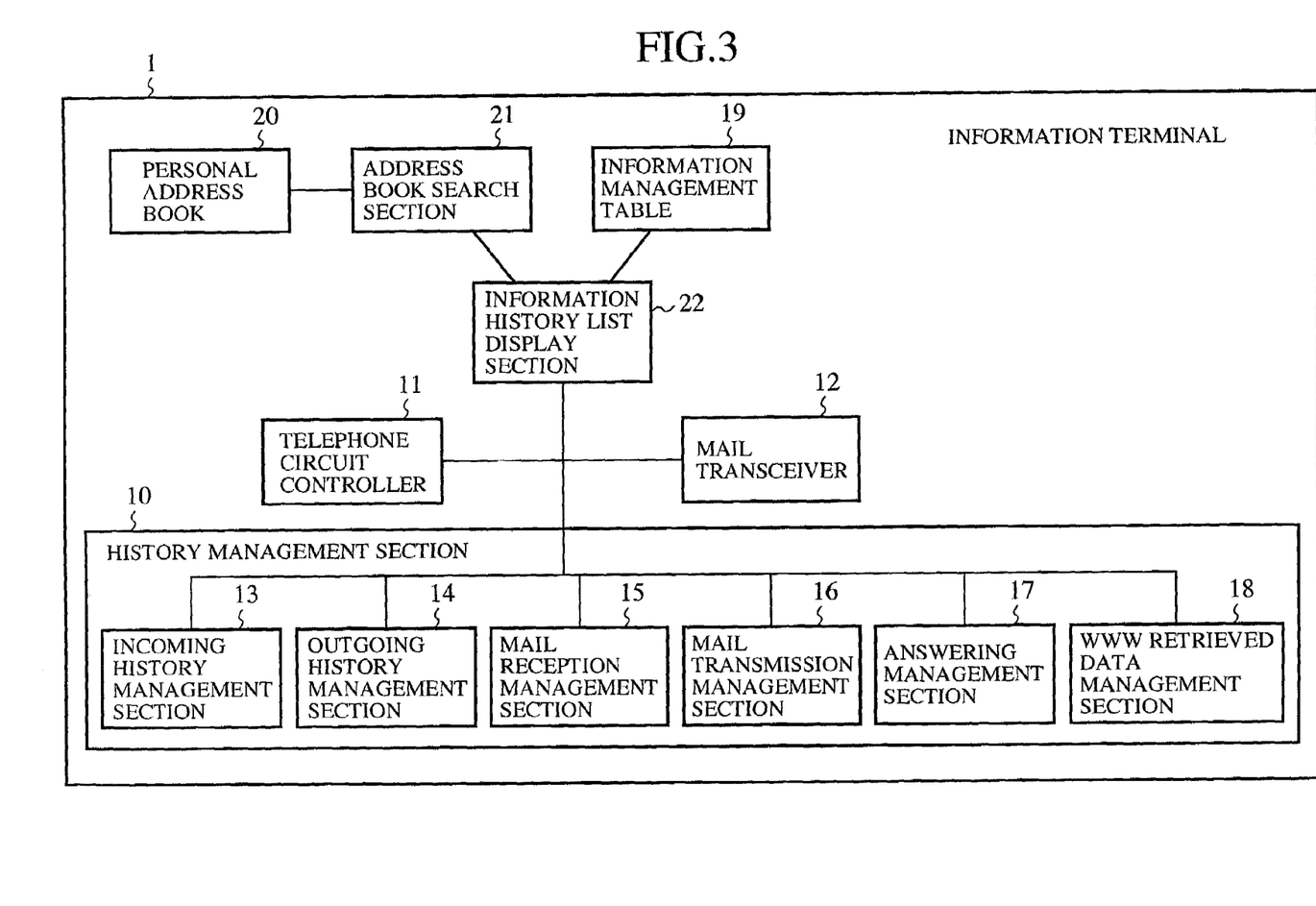
FIG. 3 is a block diagram showing a configuration of an embodiment 1 of the information terminal in accordance with the present invention.

FIG. 3 is a block diagram showing a configuration of an information terminal of an embodiment 1 in accordance with the present invention. In FIG. 3, the reference numeral 1 designates an information terminal having communication functions, like a mobile telephone and PHS (Personal Handy-phone System) that can implement communications by a plurality of communication means such as mail transmission, mail reception, telephone outgoing call, telephone incoming call, telephone answering, and WWW (World Wide Web).

The reference numeral 11 designates a telephone circuit controller for controlling incoming and outgoing calls of the information terminal 1 through a telephone line. It controls the telephone incoming and outgoing calls, telephone answering machine and WWW connections.

The reference numeral 12 designates a mail transceiver for transmitting and receiving electronic mail of the information terminal 1.

The reference numeral 13 designates an incoming history management section for recording a telephone incoming history such as parties' telephone numbers and time and date of incoming calls, as the communication history information.

The reference numeral 14 designates an outgoing history management section for recording a telephone outgoing history such as parties' telephone numbers and time and date of outgoing calls, as the communication history information.

The reference numeral 15 designates a mail reception management section for recording a mail receiving history such as parties' mail addresses and time and date of received mail, as the communication history information.

The reference numeral 16 designates a mail transmission management section for recording a mail transmission history such as parties' mail addresses and time and date of transmitted mail, as the communication history information.

The reference numeral 17 designates an answering management section for recording an answering history such as parties' telephone numbers and time and date of telephone incoming calls recorded by a telephone answering machine, as the communication history information.

The reference numeral 18 designates a WWW retrieved data management section for recording a WWW retrieval history of WWW information such as information types (news, weather forecast and the like) and time and date, as the communication history information.

In the present embodiment, the history management section 10 for storing the communication history information about the various communication means comprises the incoming history management section 13, outgoing history management section 14, mail reception management section 15, mail transmission management section 16, answering management section 17, and WWW retrieved data management section 18 to record the history information about each one of the plurality of communication means.

The reference numeral 19 designates an information management table for recording history related information that indicates a processing state of each pieces of the history information recorded in the incoming history management section 13, outgoing history management section 14, mail reception management section 15, mail transmission management section 16, answering management section 17, and WWW retrieved data management section 18. When a communication such as a reply is made for a piece of the information history, the information management table 19 records the relationship between them, that is, the relationship between the pieces of the history information, as the history related information.

The reference numeral 20 designates a personal address book for recording parties' personal names and their communication addresses. Here, as the communication addresses, mail addresses and telephone numbers are recorded for mail and telephones, respectively.

The reference numeral 21 designates an address book search section for searching the personal address book 20.

The reference numeral 22 designates an information history list display section for displaying the history information items in connection with their processing states on the basis of the history related information recorded in the information management table 19. The information history list display section 22, when a piece of the history information is generated as a result of a communication, and when the information management table 19 includes a record of the history related information, displays the history information in connection with the history information about that history information on the basis of the history related information.

The information history list display section 22 is configured such that it displays all the items of the communication history information together resulting from a plurality of different communication means, and that it displays the personal names in substitution for the communication addresses in the history information in accordance with the retrieval results of the address book search section 21.

Figure 4:
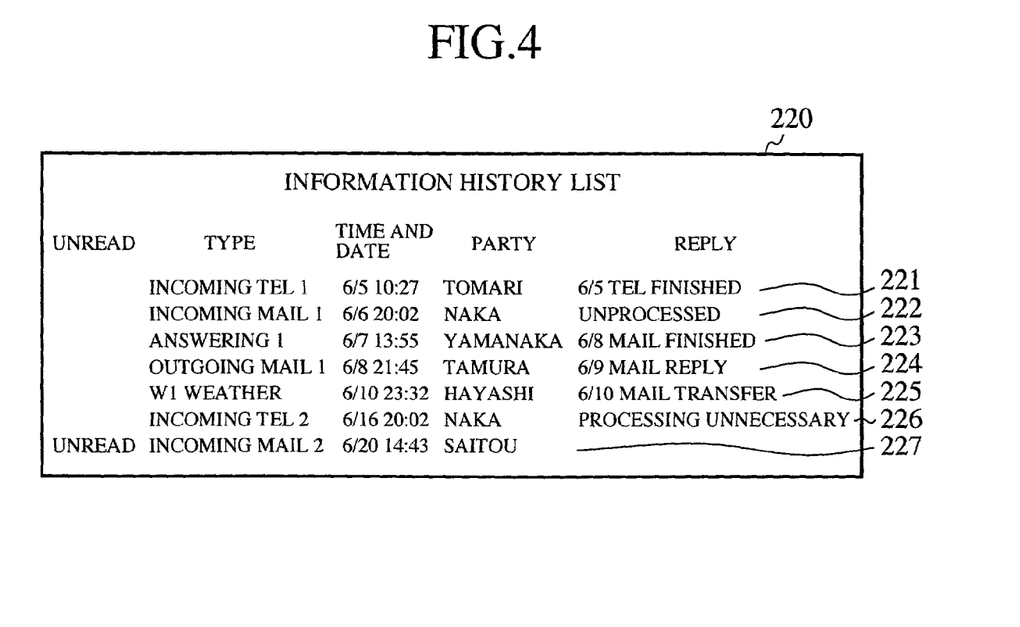
FIG. 4 is a diagram illustrating an example of a history display screen displayed on the information history list display section of the embodiment 1 in accordance with the present invention.
Figure 5:
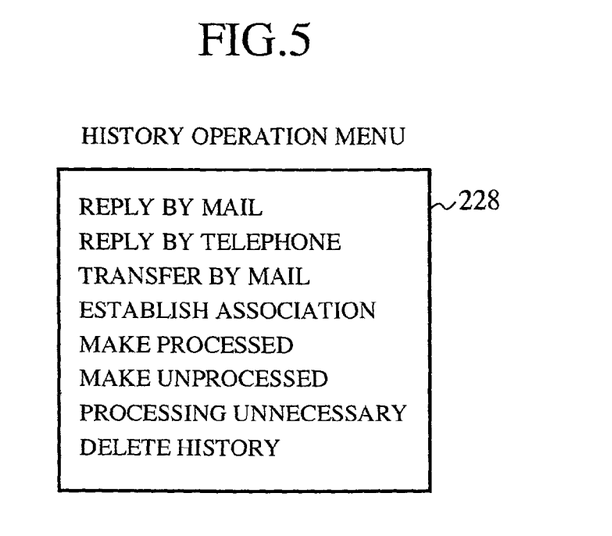
FIG. 5 is a diagram illustrating an example of the history operation menu of the embodiment 1 in accordance with the present invention.
Figure 6:
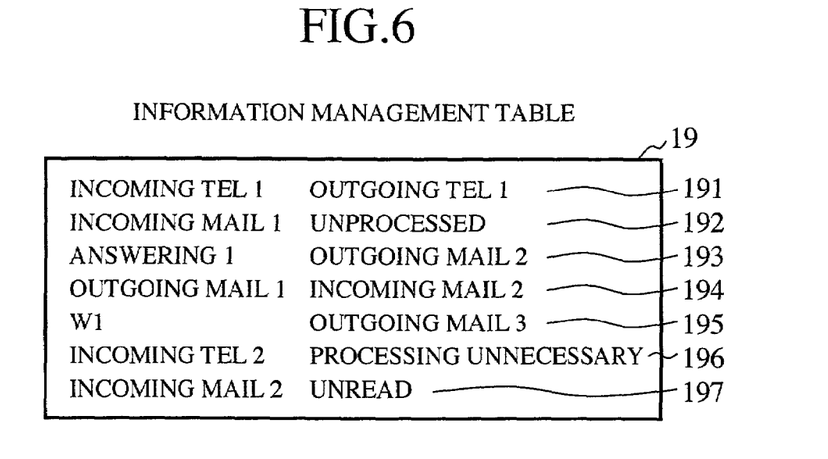
FIG. 6 is a diagram illustrating an example of the history related information recorded in the information management table of the embodiment 1 in accordance with the present invention.
Figure 7:
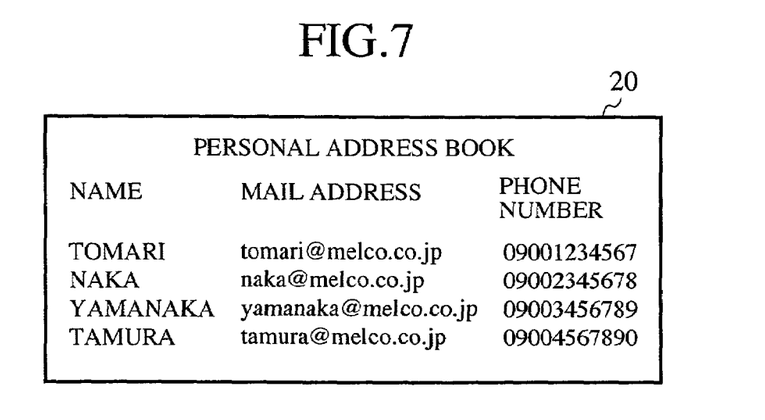
FIG. 7 is a diagram illustrating an example of communication addresses recorded in the personal address book of the embodiment 1 in accordance with the present invention.

FIG. 4 is a diagram illustrating an example of a history display screen 220 displayed by the information history list display section 22 in the present embodiment 1 in accordance with the present invention. FIG. 5 is a diagram illustrating an example of a history operation menu 228 that is displayed when any one of items is selected on the history display screen 220 in the embodiment 1 in accordance with the present invention. FIG. 6 is a diagram illustrating an example of the history related information recorded in the information management table 19, one of the components of the embodiment 1 in accordance with the present invention. FIG. 7 is a diagram illustrating an example of communication addresses recorded in the personal address book 20, one of the components of the embodiment 1 in accordance with the present invention.

Next, the operation of the information display method will be described.

First, a user registers his or her personal name, mail address and communication address of the telephone number in the personal address book 20 in advance.

When the information terminal 1 receives a telephone incoming call, the incoming history management section 13 records the necessary data such as the party's telephone number and time and date of the incoming call as the history information. Likewise, when the information terminal 1 makes a telephone call, the outgoing history management section 14 records the necessary data such as the party's telephone number and time and date of the call as the history information. Besides, when it receives a mail message, the mail reception management section 15 records the necessary data such as the party's mail address and the time and date of the message as the history information. Furthermore, when it transmits a mail message, the mail transmission management section 16 records the necessary data such as the party's mail address and time and date of the message as the history information.

When the user does not respond to an incoming call, and hence the telephone answering machine records it, the answering management section 17 records information about the recorded message together with the party's telephone number and time and date of the incoming call as the history information. Furthermore, when it retrieves information from the WWW, the WWW retrieved data management section 18 records the necessary data such as information types (news, weather forecast and the like) and time and date of the retrieved data as the history information.

In this way, every time a communication is made by communication means such as the telephone incoming or outgoing call, mail transmission or reception, telephone answering or WWW connection, the information management table 19 records the history related information indicating the processing state of the history information. In addition, when a communication such as a reply is made for a piece of the history information, the relationship between these items of the history information is recorded as the history related information.

For example, in FIG. 6, the first item 191 indicates that the first data of the incoming history is associated with the first data of the outgoing history 1. Likewise, the second item 192 indicates that the received mail 1 is yet to be processed; the third item 193 indicates that the answering 1 is replied by a transmitted mail 2; the fourth item 194 indicates that the reply to the transmitted mail message 1 is the received mail message 2; the fifth item 195 indicates that the WWW retrieved data 1 is transferred via the transmitted mail message 3; the sixth item 196 indicates that no replay is needed for the incoming history 2; and the seventh item 197 indicates that the received mail message 2 is yet to be read. Thus, the information management table 19 records the processing state of each item of the history information as the history related information, and besides records the relationship between items of the history information when a communication such as a reply is made for a particular item of the history information.

When the user carries out the operation requesting for the information list display, the information history list display section 22 displays the history display screen 220 as illustrated in FIG. 4. It displays the history information items in connection with their processing states on the basis of the history related information stored in the information management table 19, of the history information recorded in the history management section 10, and of the results of the retrieval from the personal address book 20 by the address book search section 21. Furthermore, when a communication such as a reply is made for a piece of the history information, and hence the relationship between items of the history information is recorded in the information management table 19 as the history related information, the information history list display section 22 displays the history information in connection with the history information about that history information on the basis of the history related information.

Thus, displaying the history information items in connection with their processing states enables the user to check whether the processing of each piece of the history information is carried out or not at a glance. Furthermore, displaying the history information in connection with the history information about that history information enables the user to check the types of the processing performed on the history information at a glance. Moreover, displaying the history information items brought about the different communication means not on separate screens, but on the same screen enables the user to check the history information items obtained by the plurality of communication means at a glance. In addition, displaying the personal names in substitution for the communication addresses enables the user to check the parties easily, because the parties of the communications through the different communication means are displayed in their own personal names.

Next, the operation will be described in detail of the information management table 19 that records the history related information, and of the information history list display section 22 that carries out its display in accordance with the history related information.

Figure 8:
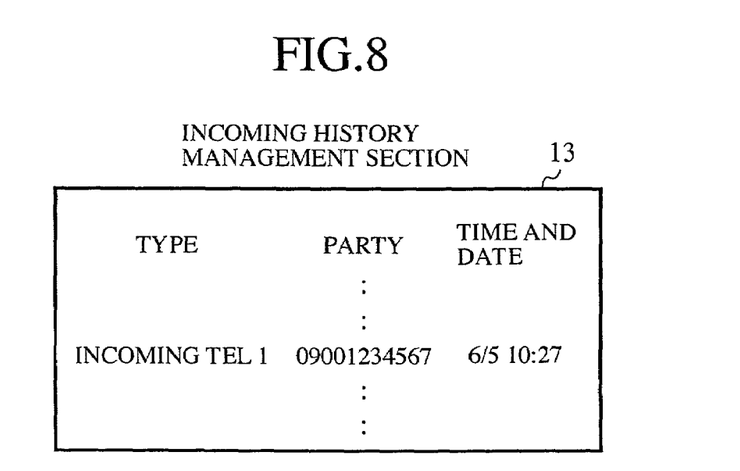
FIG. 8 is a diagram illustrating an example of the history information recorded in the incoming history management section of the embodiment 1 in accordance with the present invention.
Figure 9:
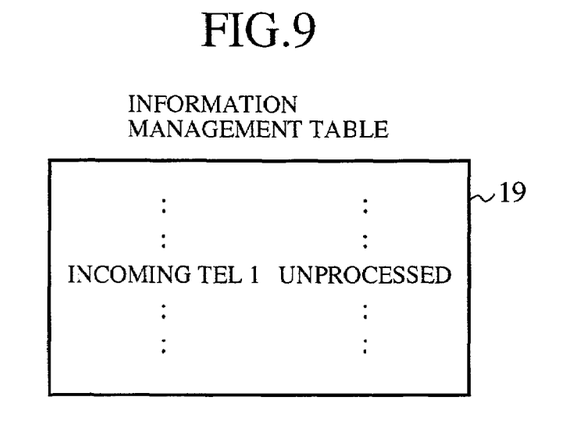
FIG. 9 is a diagram illustrating an example of the history related information recorded in the information management table of the embodiment 1 in accordance with the present invention.
Figure 10:
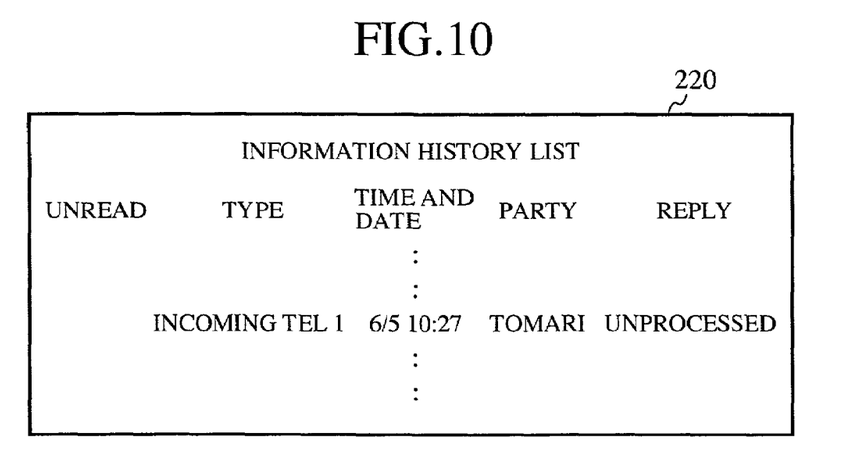
FIG. 10 is a diagram illustrating an example of a history display screen displayed on the information history list display section of the embodiment 1 in accordance with the present invention.
Figure 11:
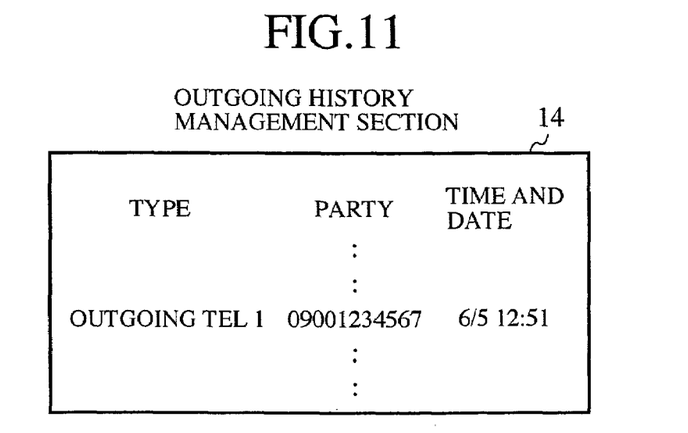
FIG. 11 is a diagram illustrating an example of the history information recorded in the outgoing history management section of the embodiment 1 in accordance with the present invention.
Figure 12:
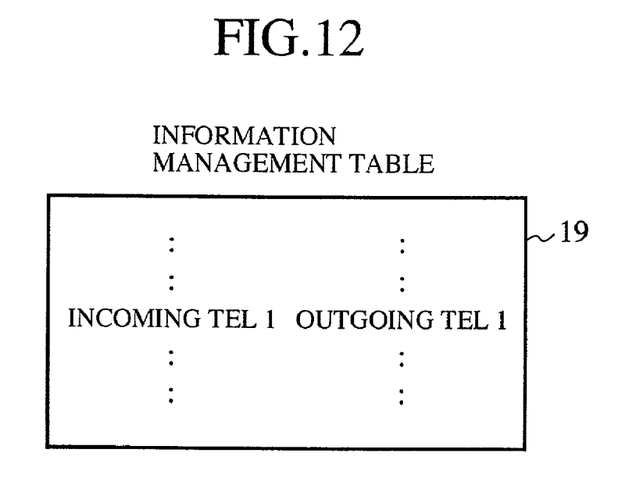
FIG. 12 is a diagram illustrating an example of the history related information recorded in the information management table of the embodiment 1 in accordance with the present invention.
Figure 13:
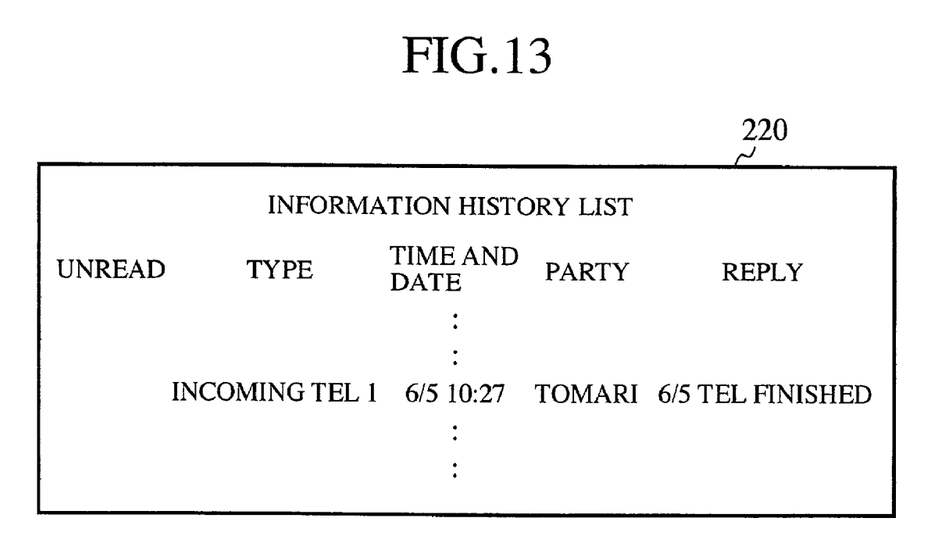
FIG. 13 is a diagram illustrating an example of a history display screen displayed on the information history list display section of the embodiment 1 in accordance with the present invention.

FIGS. 8–13 are diagrams for describing the operation. FIG. 8 illustrates the contents recorded in the incoming history management section 13. FIGS. 9 and 12 illustrate the contents recorded in the information management table 19. FIGS. 10 and 13 illustrate the contents displayed on the information history list display section 22. FIG. 11 illustrates the contents recorded in the outgoing history management section 14.

As for a method of bringing the history information items into correspondence in the information management table 19, the history information items can be related automatically, when the user makes a reply by mail or telephone by performing operation on the history operation menu 228 as illustrated in FIG. 5.

For example, when the information terminal 1 receives a telephone incoming call, the incoming history management section 13 records the telephone incoming history including the telephone number (09001234567) and the time and date (6/5 10:27) of the incoming call (incoming TEL 1) as the history information as illustrated in FIG. 8. In response to this, the information management table 19 records the history related information indicating the processing state (unprocessed) corresponding to the incoming call (incoming TEL 1) as "incoming TEL 1 unprocessed" as illustrated in FIG. 9. On the other hand, the address book search section 21 retrieves a name (Tomari) corresponding to the telephone number (09001234567) from the personal address book 20 as illustrated in FIG. 7. Subsequently, on the basis of the retrieval results, of the recorded contents of the incoming history management section 13 as illustrated in FIG. 8 and of the contents of the information management table 19 as illustrated in FIG. 9, the information history list display section 22 displays the history information about the incoming call (incoming TEL 1), "incoming TEL 1 6/5 10:27 Tomari" in connection with its processing state "unprocessed" as the history display screen as illustrated in FIG. 10.

In response to the user's operation of the "reply by telephone" on the history operation menu 228 in FIG. 5, the address book search section 21 retrieves the telephone number (09001234567) corresponding to the name (Tomari), and the telephone circuit controller 11 controls the outgoing call using the telephone number (09001234567), so that the user can make a reply by telephone to the party of the incoming call (incoming TEL 1).

Subsequently, when the information terminal 1 makes the outgoing call based on the operation on the history operation menu 228, the outgoing history management section 14 records the outgoing history including the telephone number (09001234567) and time and date (6/5 12:51) of the outgoing call (outgoing TEL 1) as the history information as illustrated in FIG. 11. In addition, as illustrated in FIG. 12, the information management table 19 records that the history information relating to the incoming call (incoming TEL 1) is the outgoing call (outgoing TEL 1) as the history related information. Then, as illustrated in FIG. 13, the information history list display section 22 displays the history information of the incoming call (incoming TEL 1), "incoming TEL 1 6/5 10:27 Tomari" and its processing state "6/5 TEL finished" in accordance with the recorded contents of the incoming history management section 13 as illustrated in FIG. 8, with the recorded contents of the outgoing history management section 14 as illustrated in FIG. 11, with the retrieval results of the address book search section 21, and with the contents of the information management table 19 as illustrated in FIG. 12. Thus, the information history list display section 22 displays the history information "incoming TEL 1 6/5 10:27 Tomari" in connection with the history information "outgoing TEL 1 09001234567 6/5 12:51".

In this way, when the user makes a "reply by mail" or "reply by telephone" through the operation on the history operation menu 228 as illustrated in FIG. 5, the history information items are related automatically.

On the other hand, even when the reply to the incoming call (incoming TEL 2) is unnecessary, if the user selects the "processing unnecessary" in the history operation menu 228 of FIG. 5, the information management table 19 records the history related information indicating the processing state (processing unnecessary) corresponding to the incoming call (incoming TEL 2) as "incoming TEL 2 processing unnecessary" in response to the user's selection. Thus, the information history list display section 22 displays "incoming TEL 2 6/16 20:02 Naka processing unnecessary" as denoted by the reference numeral 226 of FIG. 4.

If the association cannot be established in response to the operation of the user on the history operation menu 228 of FIG. 5, the user selects "establish association" from the menu to establish association manually.

For example, when the party is not present in the usual place, the user can make a call or transmit a message to another number or mail address. In such a case, each history is recorded and displayed without association. In such a case, when the user selects the original history information (incoming call), followed by selecting the "establish association" from the history operation menu 228, and the history information to be associated with (outgoing call or transmission), the information management table 19 records the history information (incoming call) in connection with the history information (outgoing call or transmission), thereby manually establishing the association.

As described above, the present embodiment 1 displays the history information in connection with its processing state. Thus, it enables the user to check whether the processing indicated by the history information has been completed or not at a glance, thereby offering an advantage of being able to manage the history information efficiently.

In addition, the present embodiment 1 displays the history information in connection with the history information about that history information. Thus, it enables the user to check the type of the processing that has been carried out for the history information at a glance, thereby offering an advantage of being able to manage the history information efficiently.

Furthermore, the present embodiment 1 displays the history information items resulting from different communication means not on the separate screens, but on the same screen. Thus, it enables the user to check the history information about the plurality of communication means at a glance, thereby offering an advantage of being able to manage the history information efficiently.

Moreover, the present embodiment 1 replaces the communication addresses by the personal names so that the communication parties via the different communication means can be displayed by their own personal names. Thus, it enables the user to identify the parties, thereby offering an advantage of being able to manage the history information efficiently.

Although the description of the present embodiment is made taking an example of the information terminal having the communication functions, the present embodiment is also applicable to an information terminal connected to a separate mobile telephone or PHS.

In addition, unprocessed history information can be assigned priority as the history related information, so that the information history list display section 22 can rearrange the data in that order, or display them using color codes, thereby facilitating their distinction or use.

Furthermore, when the user does not reply for more than a predetermined time, one week, for example, that is, when the history related information corresponding to the history information about the reception or incoming call is in the "unprocessed" state for more than a week, an additional function for prompting the user to check a reply will improve the operability of the present embodiment.

In addition, recording the medium (communication means) for the reply, reply address and telephone number of a particular party in advance in the personal address book enables the information terminal 1 to automatically decide the communication means the party desires, and send a reply. Besides, it can change destinations of the party in accordance with a day of a week, and the time of a day.

For example, even when the information terminal 1 is called from the home of the party, the reply can be made to the mobile telephone, or to the mail address of the company in the daytime of a weekday, improving the ease of use.

Moreover, a redirection function of an incoming call or mail that can automatically transfer it without operating the history operation menu can be added for particular parties. For example, as for the parties to be avoided during a conference or work, or the parties to whom it is unnecessary to respond immediately, they can be recorded in the personal address book so that their calls are automatically routed to a medium other than the information terminal 1 (such as mail of the company, or the telephone answering machine of the home), thereby further improving the ease of use.

Embodiment 2

Although the history management section 10, information management table 19 and personal address book 20 are installed in the information terminal 1 in the foregoing embodiment 1, they are installed in the server in the present embodiment 2, so that the history information list is displayed on the information terminal 1 capable of communicating with the server.

Figure 14:
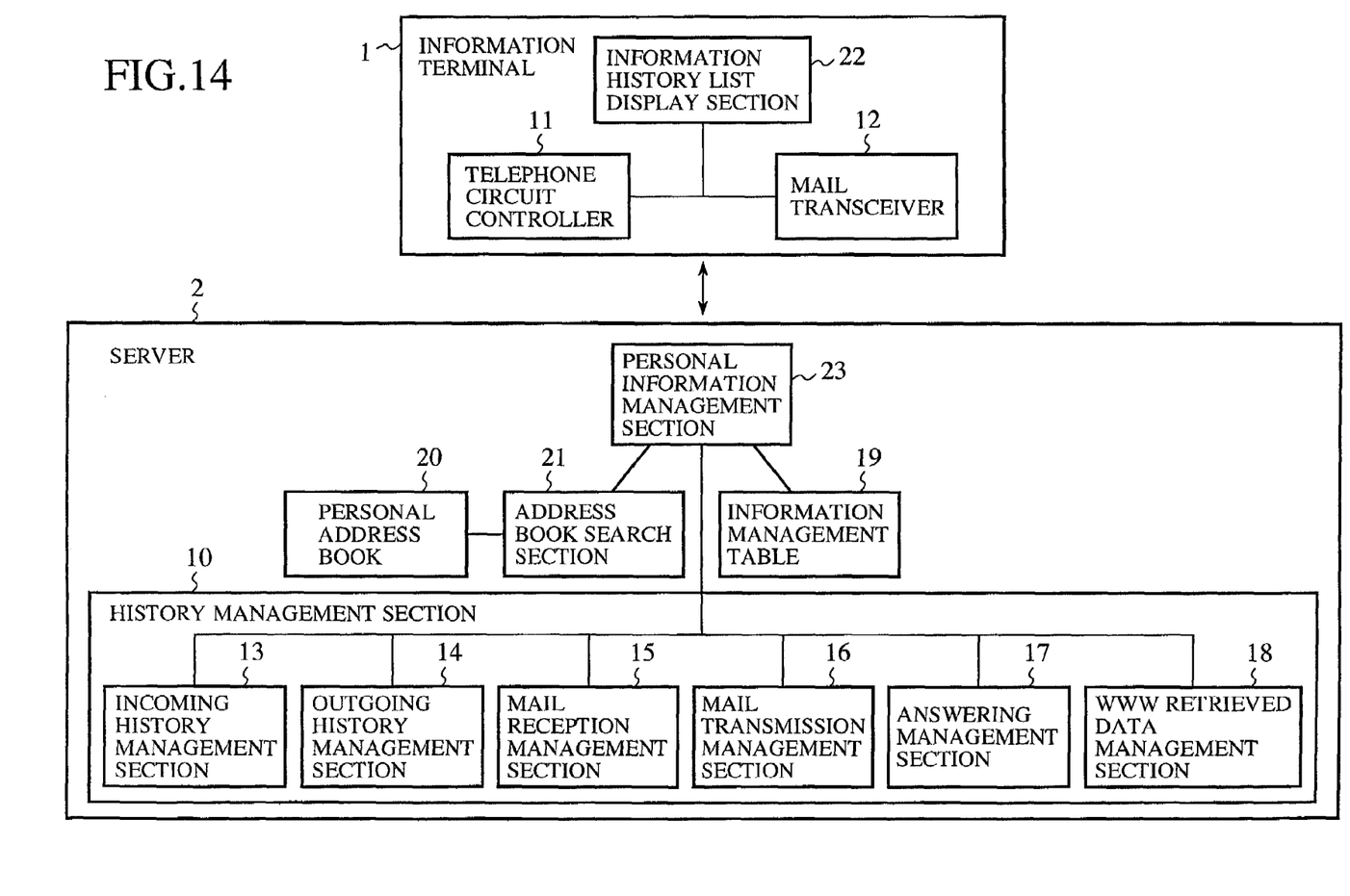
FIG. 14 is a block diagram showing a configuration of an information display system of an embodiment 2 in accordance with the present invention.

FIG. 14 is a block diagram showing a configuration of an information display system of the embodiment 2 in accordance with the present invention. In FIG. 14, the reference numeral 2 designates a server that communicates with the information terminal 1; and 23 designates a personal information management section installed in the server 2. In FIG. 14, the same or like portions to those of FIG. 1 are designated by the same reference numerals, and the description thereof is omitted here. As shown in FIG. 14, the information display system of the present embodiment comprises the information terminal 1 and the server 2, which are capable of communicating with each other.

In the server 2, the personal information management section 23 identifies the user of the information terminal 1, and transmits the history information stored in the history management section 10 and the history related information stored in the information management table 19 to the information terminal 1. The personal information management section 23 also transmits the retrieval results by the address book search section 21 to the information terminal 1.

In the information terminal 1, the information history list display section 22 receives the history information and history related information transmitted from the personal information management section 23 of the server 2. The information history list display section 22 also receives the retrieval results by the address book search section 21.

Next, the operation of the information display method will be described.

In FIG. 14, when the user of the information terminal 1 conducts communications by the communication means, their history information is recorded in the history management section 10 in the server 2. In addition, the history related information indicating the processing state of each piece of the history information is recorded in the information management table 19 in the server 2.

In response to the user's operation on the information list display, the information history list display section 22 in the information terminal 1 communicates with the server 2, and receives the history information items of the history management section 10, the retrieval results by the address book search section 21, and the history related information recorded in the information management table 19 in the server 2 via the personal information management section 23, thereby displaying them on the history display screen. Thus, the user of the information terminal 1 can check the history information.

The operation of the user is the same as that of the foregoing embodiment 1. For example, in response to the user's operation on the history operation menu 228 on the information history list screen, the information history list display section 22 in the information terminal 1 communicates with the personal information management section 23 in the server 2, as needed, so that the user can make mail transmission, telephone call or the like as in the embodiment 1. All the history information and history related information about the operation are recorded in the server 2.

As described above, according to the present embodiment 2, the server 2 comprises the history management section 10, information management table 19, and personal address book 20, and the information terminal 1 capable of communicating with the server 2 comprises the information history list display section 22, thereby enabling the server 2 to manage the history information items collectively. Accordingly, the present embodiment 2 offers an advantage of being able to reduce the amount of the information to be recorded in the mobile terminal 1 with a small memory capacity, thereby allowing it to handle an increasing amount of information to be stored.

According to the present embodiment 2, installing the history management section 10 in the server 2 enables the server 2 to grasp the frequency of access to the services by the user. Thus, it offers an advantage of enabling the carrier or service provider of mobile phones that manages the server 2 to bill the users by the frequency of access, or to capture data for developing a new service.

Furthermore, since the present embodiment 2 comprises the server 2 comprises the history management section 10 and information management table 19, it offers the following advantages. When a user makes a reply to an incoming mail message to the information terminal 1 from another information terminal such as a personal computer, and when the user contracts with the same provider that manages the server 2, the server 2 can manage the information by establishing association between them, and display the list. In addition, when the user makes a reply by telephone, the server 2 can provide the information list as long as the telephone number is linked with the telephone number of the information terminal 1.

Embodiment 3

In the foregoing embodiment 2, the history management section 10, information management table 19 and personal address book 20 are installed in the server 2, and the history information list is displayed on the information terminal 1 capable of communicating with the server 2. In the present embodiment 3, however, the information management table 19 is provided in the server 2, and the history management section 10 and personal address book 20 are installed in the information terminal 1 capable of communicating with the server 2, so that the history information list is displayed on the information terminal 1.

Figure 15:
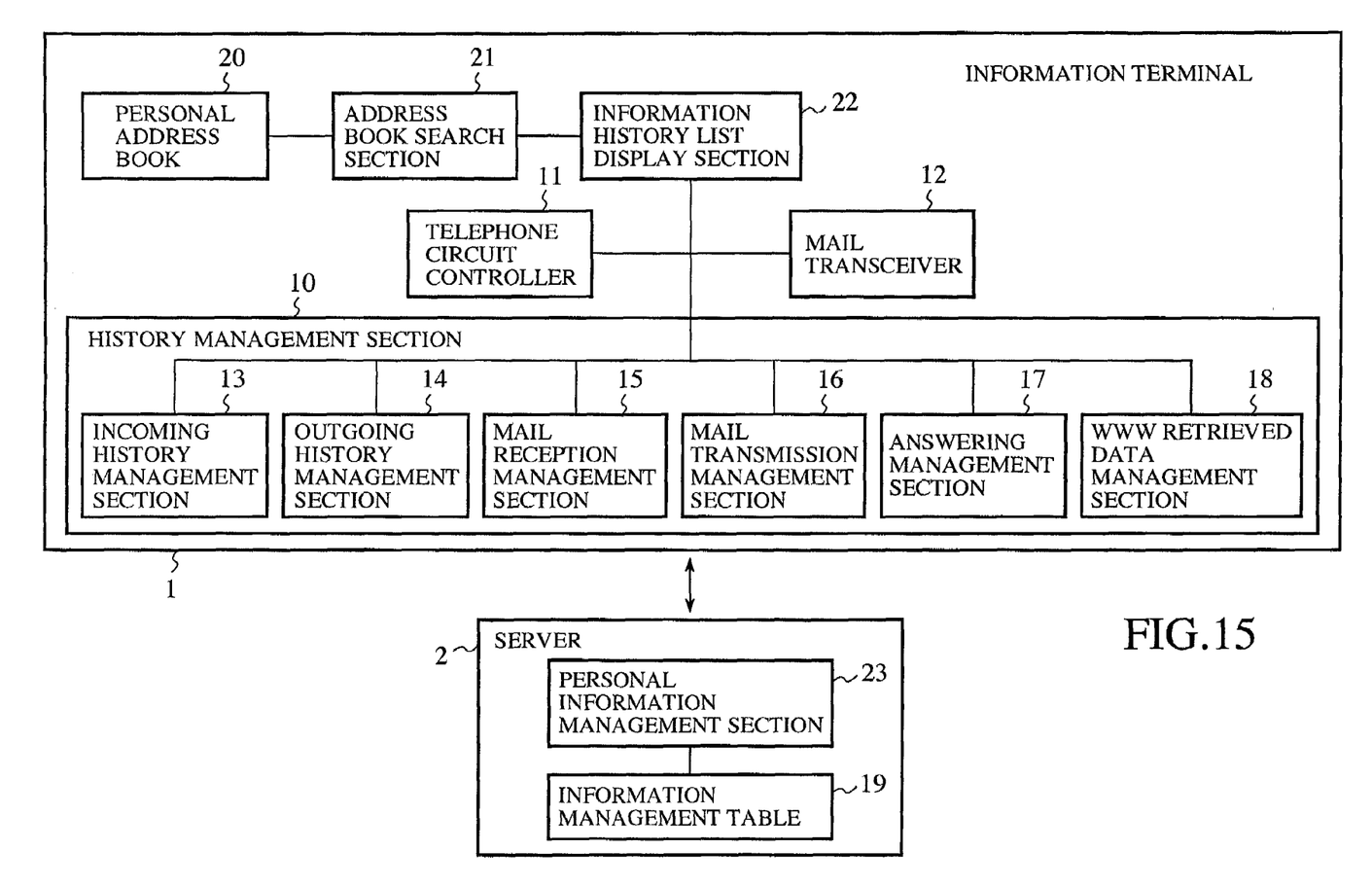
FIG. 15 is a block diagram showing a configuration of an information display system of an embodiment 3 in accordance with the present invention.

FIG. 15 is a block diagram showing a configuration of an information display system of the embodiment 3 in accordance with the present invention. In FIG. 15, the same or like portions to those of FIG. 14 are designated by the same reference numerals, and the description thereof is omitted here. As shown in FIG. 15, the information display system of the present embodiment comprises the information terminal 1 and the server 2, which are capable of communicating with each other.

In the present embodiment, the personal information management section 23 in the server 2 transmits the history related information stored in the information management table 19 to the information terminal 1. On the other hand, the information history list display section 22 in the information terminal 1 receives the history related information from the personal information management section 23 in the server 2.

Next, the operation of the information display method will be described.

In FIG. 15, when the user of the information terminal 1 conducts communications by the communication means, their history information is recorded in the history management section 10 in the information terminal 1. In addition, the history related information indicating the processing state of each piece of the history information is recorded in the information management table 19 in the server 2.

In response to the user's operation on the information list display, the information history list display section 22 in the information terminal 1 communicates with the server 2, and receives the history related information recorded in the information management table 19 in the server 2 via the personal information management section 23. Thus, the information history list display section 22 displays the history display screen in accordance with the history information items of the history management section 10, with the information in the personal address book 20 in the information terminal 1 and with the history related information sent from the server 2. Accordingly, the user of the information terminal 1 can check the history information.

The operation of the user is the same as that of the foregoing embodiment 1. For example, in response to the user's operation on the history operation menu 228 on the information history list screen, the information history list display section 22 in the information terminal 1 communicates with the personal information management section 23 in the server 2, as needed, so that the user can make mail transmission, telephone call or the like as in the foregoing embodiment 1. Then, the history information is recorded in the history management section 10 in the information terminal 1, and the history related information is recorded in the information management table 19 in the server 2.

As described above, according to the present embodiment 3, the server 2 comprises the information management table 19, and the information terminal 1 capable of communicating with the server 2 comprises the history management section 10, personal address book 20, and information history list display section 22. Thus, in contrast to the case where the server 2 stores all the data, the information terminal 1 stores most of the data in the same manner as the information terminal 1 of the embodiment 1, for example. Therefore, the present embodiment 3 has an advantage of being able to inspect or edit the stored data quickly without communicating with the server 2. Besides, since the server 2 comprises the information management table 19, the present embodiment 3 offers an advantage of being able to implement services in connection with other services of the provider.

Embodiment 4

In the foregoing embodiment 3, the information management table 19 is installed in the server 2, and the history management section 10 and personal address book 20 are installed in the information terminal 1 capable of communicating with the server 2, so that the information terminal 1 can display the history information list. In the present embodiment 4, however, the history management section 10 and personal address book 20 are installed in the server 2, and the information management table 19 is installed in the information terminal 1 capable of communicating with the server 2, so that the information terminal 1 displays the history information list.

Figure 16:
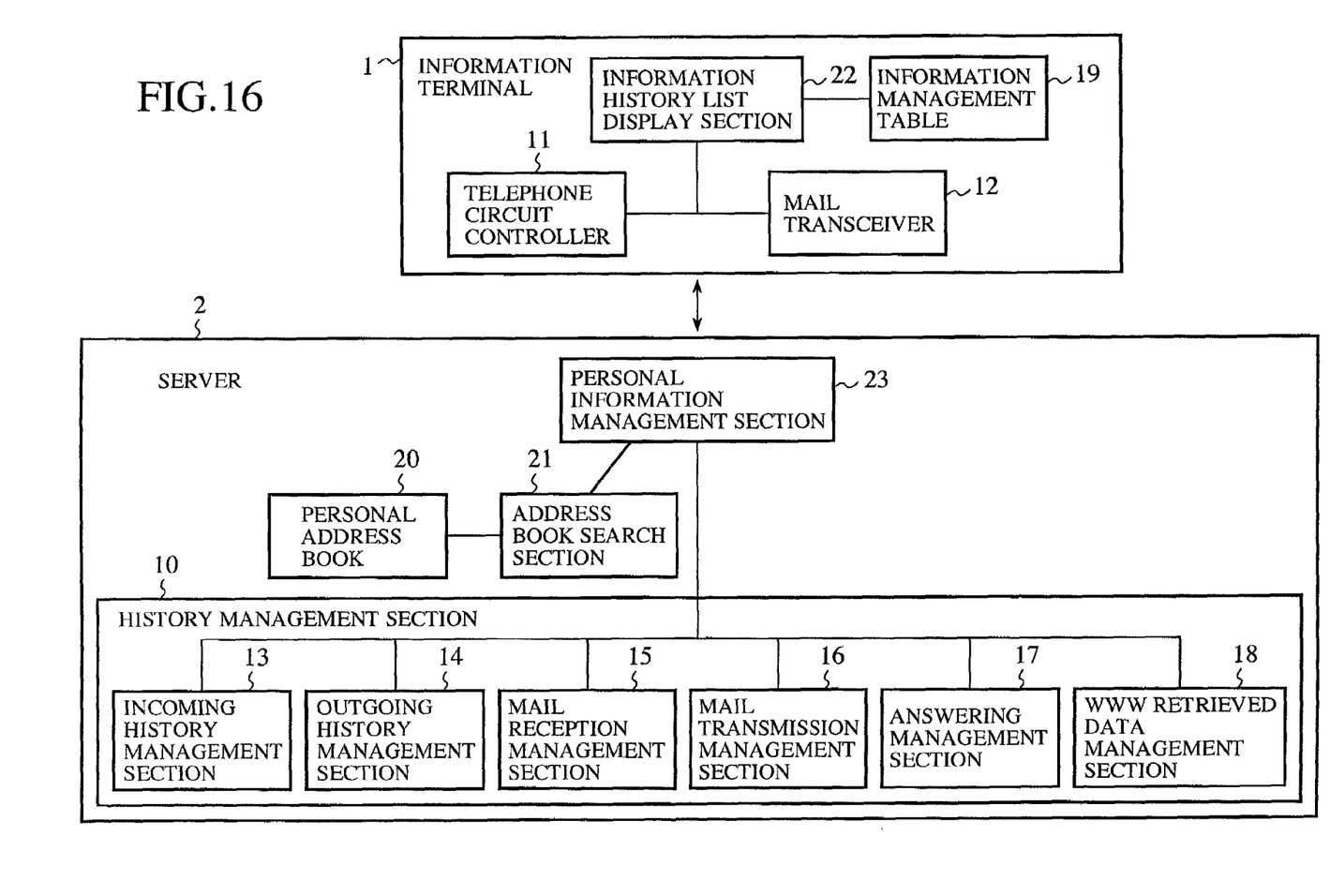
FIG. 16 is a block diagram showing a configuration of an information display system of an embodiment 4 in accordance with the present invention.

FIG. 16 is a block diagram showing a configuration of an information display system of the embodiment 4 in accordance with the present invention. In FIG. 16, the same or like portions to those of FIG. 14 are designated by the same reference numerals, and the description thereof is omitted here. As shown in FIG. 16, the information display system of the present embodiment comprises the information terminal 1 and the server 2, which are capable of communicating with each other.

In the server 2, the personal information management section 23 transmits the history information items stored in the history management section 10 and the retrieval results by the address book search section 21 to the information terminal 1. On the other hand, the information history list display section 22 in the information terminal 1 receives the history information items and the retrieval results transmitted from the personal information management section 23 of the server 2.

Next, the operation of the information display method will be described.

In FIG. 16, when the user of the information terminal 1 conducts communications by the communication means, their history information is recorded in the history management section 10 in the server 2. In addition, the history related information indicating the processing state of each piece of the history information is recorded in the information management table 19 in the information terminal 1.

In response to the user's operation on the information list display, the information history list display section 22 in the information terminal 1, referring to the information management table 19, communicates with the server 2, and receives the history information items of the history management section 10, and the retrieval results by the address book search section 21 in the server 2 via the personal information management section 23, thereby displaying the history display screen on the basis of the history related information recorded in the information management table 19 in the information terminal 1, and of the received history information items and the retrieval results. Thus, the user of the information terminal 1 can check the history information.

The operation of the user is the same as that of the foregoing embodiment 1. For example, in response to the user's operation on the history operation menu 228 on the information history list screen, the information history list display section 22 in the information terminal 1 communicates with the personal information management section 23 in the server 2, as needed, so that the user can make mail transmission, telephone call or the like as in the embodiment 1. Then, the history information is stored in the history management section 10 in the server 2, and the history related information is recorded in the information management table 19 in the information terminal 1.

As described above, according to the present embodiment 4, the server 2 comprises the history management section 10 and personal address book 20, and the information terminal 1 capable of communicating with the server 2 comprises the information management table 19 and information history list display section 22, thereby enabling the information terminal 1 to store the history related information. Accordingly, the information terminal 1 can establish the association between them and correct the association quickly by itself, thereby offering an advantage of being able to suppress useless communications.

In addition, according to the present embodiment 4, the history management section 10 is installed in the server 2 so that the server 2 stores the history information. Accordingly, the present embodiment 4 offers an advantage of being able to reduce the amount of the information to be recorded in the information terminal 1 such as a mobile telephone with a small memory capacity, thereby allowing it to handle an increasing amount of stored information without any problem.

Furthermore, according to the present embodiment 4, installing the history management section 10 in the server 2 enables the server 2 to grasp the frequency of access to the services by the users. Thus, it offers an advantage of enabling the carrier or service provider of mobile phones managing the server 2 to bill the users by the frequency of access, or to capture data for developing a new service.

As described above, the information terminal, server, information display system and information display method in accordance with the present invention display the history information of the respective communication means in connection with the processing state of the history information, and display the history information in connection with the history information about that history information. Thus, the present invention is suitable for carrying out the management of the history information efficiently.

What is claimed is:

1. An information terminal comprising:
    an information history list display section capable of displaying communication history from a plurality of different types of communications, in connection with an answering state, whether answer has been completed or not, of the respective communications based on history related information which is generated by outgoing or incoming communication and indicates the answering state of the respective communications, wherein the plurality of different types of communications include at least email, telephone and Internet communications.

2. The information terminal according to claim 1, further comprising:
    a history management section for recording the communication history; and
    an information management table for recording the history related information that indicates the answering state of the respective communications stored in said history management section.

3. The information terminal according to claim 2, wherein said information management table records relationships between the respective communications stored in said history management section as the history related information; and
    said information history list display section displays the respective communications in connection with communication which corresponds to the respective communications based on the history related information stored in said information management table.

4. The information terminal according to claim 2, wherein said information history list displays together the respective communications sent by a plurality of different communication means.

5. The information terminal according to claim 2, further comprising:
    a personal address book for recording a personal name of a communication party and a communication address of the communication party; and
    an address book search section for searching said personal address book, wherein
    said information history list display section displays the personal name in substitution for the communication address included in the respective communications stored in said history management section based on a retrieval result from said personal address book by said address book search section.

6. The information terminal according to claim 1, wherein the communication history and the history related information are stored in a server to be sent to the information terminal.

7. The information terminal according to claim 1, further comprising:
    a history management section for recording the communication history,
    wherein the history related information is stored in a server to be sent to the information terminal.

8. The information terminal according to claim 1, further comprising:
    an information management table for recording the history related information,
    wherein said communication history is stored in a server to be sent to the information terminal.

9. A server comprising:
    a personal information management section for transmitting, in response to a request from an information terminal that is capable of displaying respective communications, from a plurality of different types of communications, which belong to each of the information terminal users, and in connection with an answering state, whether answer has been completed or not, of the respective communications based on history related information which is generated by outgoing or incoming communication, requested information to said information terminal.
    wherein the plurality of different types of communications include at least email, telephone and Internet communications.

10. The server according to claim 9, further comprising:
    a history management section for recording communication history; and
    an information management table for recording history related information which indicates the answering state of the respective communications stored in said history management section.

11. The server according to claim 9, further comprising:
    an information management table for recording history related information indicating the answering state of the respective communications,
    wherein said server transmits the history related information stored in said information management table to said information terminal.

12. The server according to claim 9, further comprising:
    a history management section for recording communication history,
    wherein said server transmits the communication history stored in said history management section to said information terminal.

13. An information display system including an information terminal and a server capable of communicating with each other, said information display system comprising:
    a history management section for recording communication history;
    an information management table capable of recording history related information from a plurality of different types of communications, which is generated by outgoing or incoming communication and indicates an answering state, whether answer has been completed or not, of the respective communications stored in said history management section; and an information history list display section for displaying the respective communications in connection with the answering state of the respective communications based on the history related information stored in said information management table, wherein the plurality of different types of communications include at least email, telephone and Internet communications.

14. The information display system according to claim 13, wherein said server includes said history management section, said information management table, and a personal information management section to transmit the communication history and the history related information which belong to each of the information terminal users to the information terminal, and wherein said information terminal includes the information history list display section, and receives the communication history and history related information.

15. The information display system according to claim 13, wherein said server includes said information management table and a personal information management section to transmit the history related information which belong to each of the information terminal users, to said information terminal, and wherein said information terminal includes said history management section and said information history list display section, and receives the history related information.

16. The information display system according to claim 13, wherein said server includes said history management section and a personal information management section to transmit the communication history which belong to each of the information terminal users, to the information terminal, and wherein information terminal includes said information management table and said information history list display section, and receives the communication history.

17. An information display method comprising the steps of:

recording communication history of respective communications, from a plurality of different types of communications;

recording history related information which is generated by outgoing or incoming communication and indicates an answering state, whether answer has been completed or not, of the respective communications; and displaying the respective communications in connection with the answering state of the respective communications based on the history related information, wherein the plurality of different types of communications include at least email, telephone and Internet communications.

18. An apparatus for processing communication history information, comprising:

at least one information processor capable of maintaining a record of communication history information indicating an answering state, whether answer has been completed or not, of each item wherein said communication history information being generated from a plurality of different types of communications;

a display for displaying said communication history information, wherein the plurality of different types of communications include at least email, telephone and Internet communications.

19. The apparatus of claim 18, wherein said at least one information processor including an operating menu for generating, in response to a user selection, a reply to an item of communication history information wherein completion of said reply generating an update to answering state of said item.

* * * * *